(12) United States Patent
Faridoon

(10) Patent No.: US 8,397,772 B1
(45) Date of Patent: Mar. 19, 2013

(54) EMERGENCY TIRE SUPPORT DEVICE FOR LOW AIR PRESSURE TIRE

(76) Inventor: Husain S. A. Faridoon, Doha (KW)

( * ) Notice: Subject to any disclaimer, the term of this patent is extended or adjusted under 35 U.S.C. 154(b) by 0 days.

(21) Appl. No.: 13/535,246

(22) Filed: Jun. 27, 2012

(51) Int. Cl.
*B60C 11/00* (2006.01)
*B60C 27/18* (2006.01)

(52) U.S. Cl. .................. 152/185.1; 152/172; 152/213 R

(58) Field of Classification Search .................. 152/170, 152/171, 172, 173, 175, 176, 178, 179, 182, 152/185, 185.1, 187, 188, 190, 191, 213 R, 152/221; 301/38.1, 39.1, 40.1, 40.3, 41.1; D12/608; 156/95, 96
See application file for complete search history.

(56) References Cited

U.S. PATENT DOCUMENTS

| | | | |
|---|---|---|---|
| 2,370,790 A | 3/1945 | Glasser | |
| 3,335,776 A * | 8/1967 | Peterson | 152/222 |
| 3,797,549 A | 3/1974 | Lieberum | |
| 3,836,075 A * | 9/1974 | Botbol | 238/14 |
| 4,036,273 A | 7/1977 | Kemper | |
| 4,355,451 A | 10/1982 | Thomas | |
| 6,860,304 B1 * | 3/2005 | Dalrymple | 152/175 |
| 6,918,544 B2 | 7/2005 | Ferguson | |
| 7,198,084 B2 | 4/2007 | Riemer et al. | |
| 7,543,618 B2 | 6/2009 | Stewart | |
| 7,789,118 B2 * | 9/2010 | Lotveit | 152/221 |
| 8,047,245 B2 * | 11/2011 | Maritano | 152/213 R |
| 8,171,967 B2 * | 5/2012 | Rose | 152/175 |
| 2009/0301624 A1 | 12/2009 | Maritano | |
| 2010/0206448 A1 * | 8/2010 | Kim | 152/213 R |
| 2012/0025596 A1 * | 2/2012 | Dunham | 301/42 |

FOREIGN PATENT DOCUMENTS

| | | | |
|---|---|---|---|
| EP | 1745948 A1 * | 1/2007 | |
| FR | 2914225 A1 * | 10/2008 | |
| JP | 2008110702 A * | 5/2008 | |

OTHER PUBLICATIONS

Machine Translation of FR 2914225 A1.*

* cited by examiner

*Primary Examiner* — Kip T Kotter
(74) *Attorney, Agent, or Firm* — Richard C. Litman

(57) ABSTRACT

The emergency tire support device for a low air pressure tire includes an elongate belt formed by three layers of material that protects and supports a deflated tire. The belt wraps around the tire and is secured thereto by fasteners. The three layers include an outer layer of cloth, an inner layer of plastic, and an intermediate layer of cloth. A plurality of tacks extends through the inner layer, and the intermediate layer sandwiches the head of the tacks between the inner and intermediate layers. The tacks pierce the tread area of the tire as the tire rolls over the belt during installation, causing the belt to automatically wrap around the tire. The tacks also prevent slip. The inner and intermediate layers are stitched onto the first layer to form a plurality of longitudinal pockets. The pockets are filled with scrap rubber.

13 Claims, 6 Drawing Sheets

EMERGENCY TIRE SUPPORT DEVICE FOR LOW AIR PRESSURE TIRE

BACKGROUND OF THE INVENTION

1. Field of the Invention

The present invention relates to vehicle maintenance and repair, and particularly to an emergency tire support device for a low air pressure tire that provides a temporary tread layer sufficient to support and protect the tire and vehicle until repairs and/or replacement can be safely made.

2. Description of the Related Art

Vehicles of various makes and models have become prolific throughout the world. They provide convenient transportation for work, entertainment, education and delivery of goods. Many highways, byways and other roads have been built as a vital infrastructure to support the economy of a region. Maintenance and upkeep of these roads help to ensure that the economic engine continues to turn. However, as important as the roads may be, the vehicles themselves must also be well maintained for the safety of the motorist and others.

Besides the engine, chassis and the accoutrements of a vehicle, the tires are a very important component. If the tires are well maintained and properly inflated, they will last for a relatively long time, often past the rated mileage for a given tire. Properly inflated tires insure even wear, and this, in turn, prevents misalignment, which can have a detrimental effect on the steering characteristics of the vehicle. Moreover, negligent tire maintenance or inattention can lead to accidents and/or vehicle damage.

Checking and maintaining proper inflation of tires are relatively simple and easy tasks. However, there are many inadvertent instances in which the tires can have low air pressure due, e.g., to pothole impacts and unforeseen punctures from road debris. When this occurs, the motorist must pull off the road to inspect and potentially repair the low pressure tire or risk damage to the rim and/or hub. This can be very hazardous, especially on a congested or busy road. A spare tire should suffice in most situations, but many do not carry or have access to a spare or the tools for the repair. Some motorists are fortunate to have access to emergency services via individual vehicle insurance companies or easy access to nearby repair shops. Others, especially in under developed areas of the world, do not have such ready access.

One solution to the above involves a covering that wraps the entire tire. The covering is comprised of a plurality of longitudinal strips that wrap around radial segments of the tire with the ends of individual strips secured to the rim by rivets. While such a configuration may protect the rubber tire, it is impractical for field repair due to the tedious process of mounting and securing each strip and the permanent nature of the mounting. Moreover, friction from traveling contact with the road can potentially cause one or more of the strips to expose the tire underneath.

Another solution involves using a patch to temporarily block a puncture. However, most motorists do not have specialized patching equipment on hand or a pump to re-inflate the tire.

In light of the above, it would be a benefit in the vehicle maintenance art to provide a means of supporting a low air pressure tire in an expeditious manner until proper repairs or replacement can be made. Thus, an emergency tire support device for low air pressure tire solving the aforementioned problems is desired.

SUMMARY OF THE INVENTION

The emergency tire support device for low air pressure tire includes an elongate belt formed by three layers of material that protects and supports a deflated tire. The belt wraps around the tire and is secured thereto by fasteners. The three layers include an outer first layer of cloth, an inner second layer of plastic, and an intermediate third layer of cloth. A plurality of tacks extends through the second layer, and the third layer sandwiches the head of the tacks between the second and third layers. The tacks pierce the tread area of the tire as the tire rolls over the belt during installation, causing the belt to automatically wrap around the tire. The tacks also prevent slip. The second and third layers are stitched onto the first layer to form a plurality of longitudinal pockets. The pockets are filled with scrap rubber, which adds overall thickness that compensates for the deflation and provides resiliency similar to that of normal treads.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
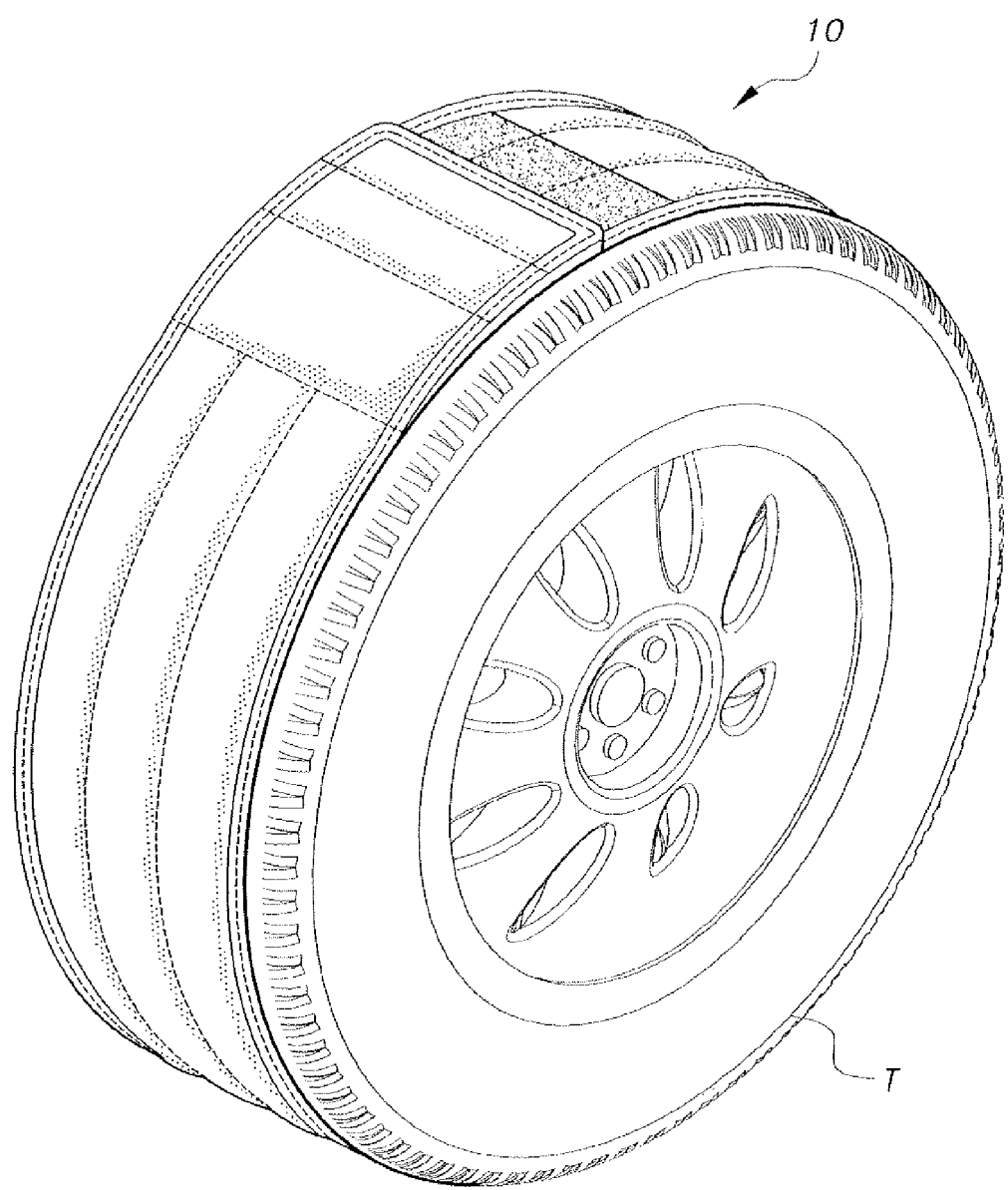
FIG. 1 is an environmental, perspective view of an emergency tire support device for low air pressure tire according to the present invention.
Figure 2:
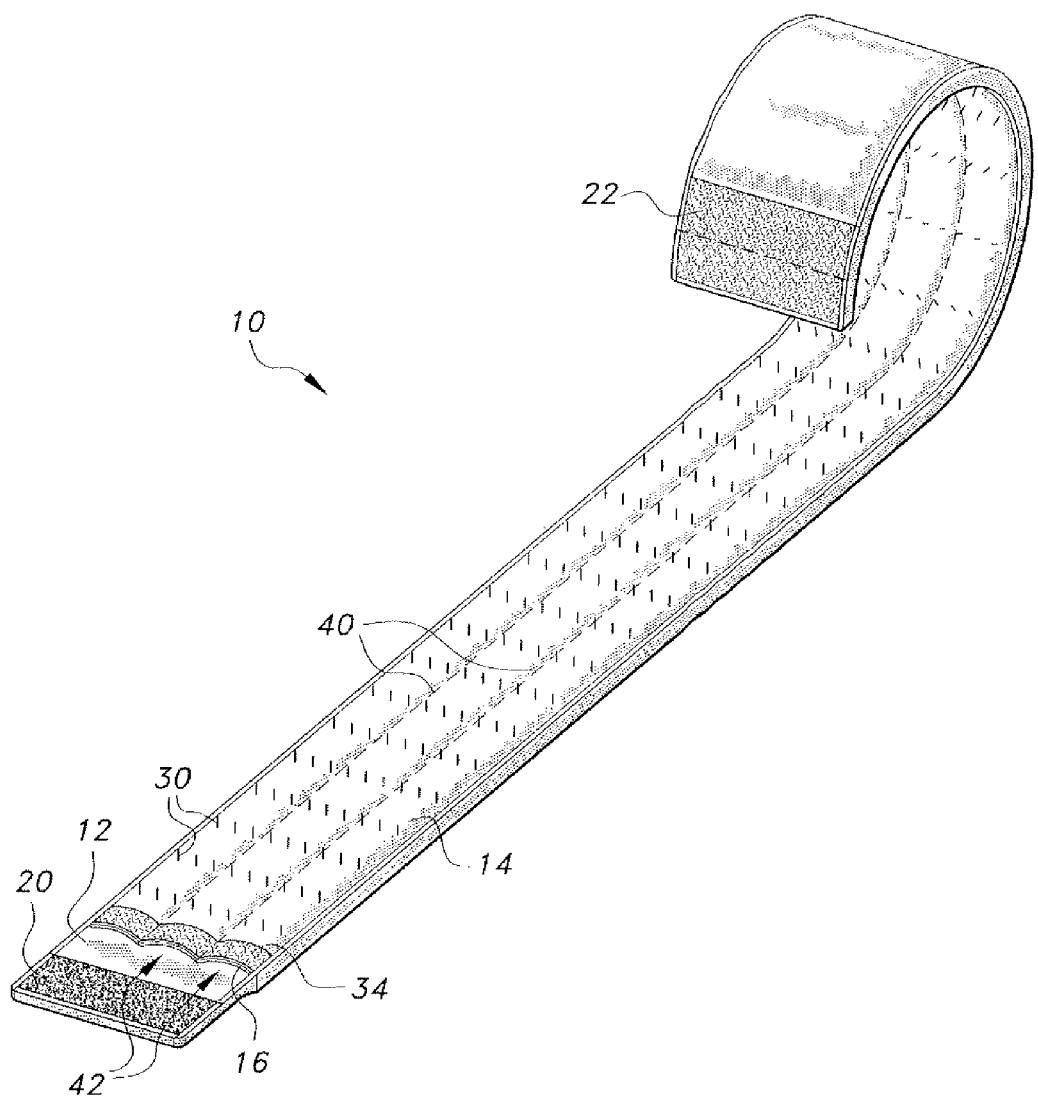
FIG. 2 is a perspective view of the emergency tire support device for low air pressure tire shown in FIG. 1.
Figure 3:
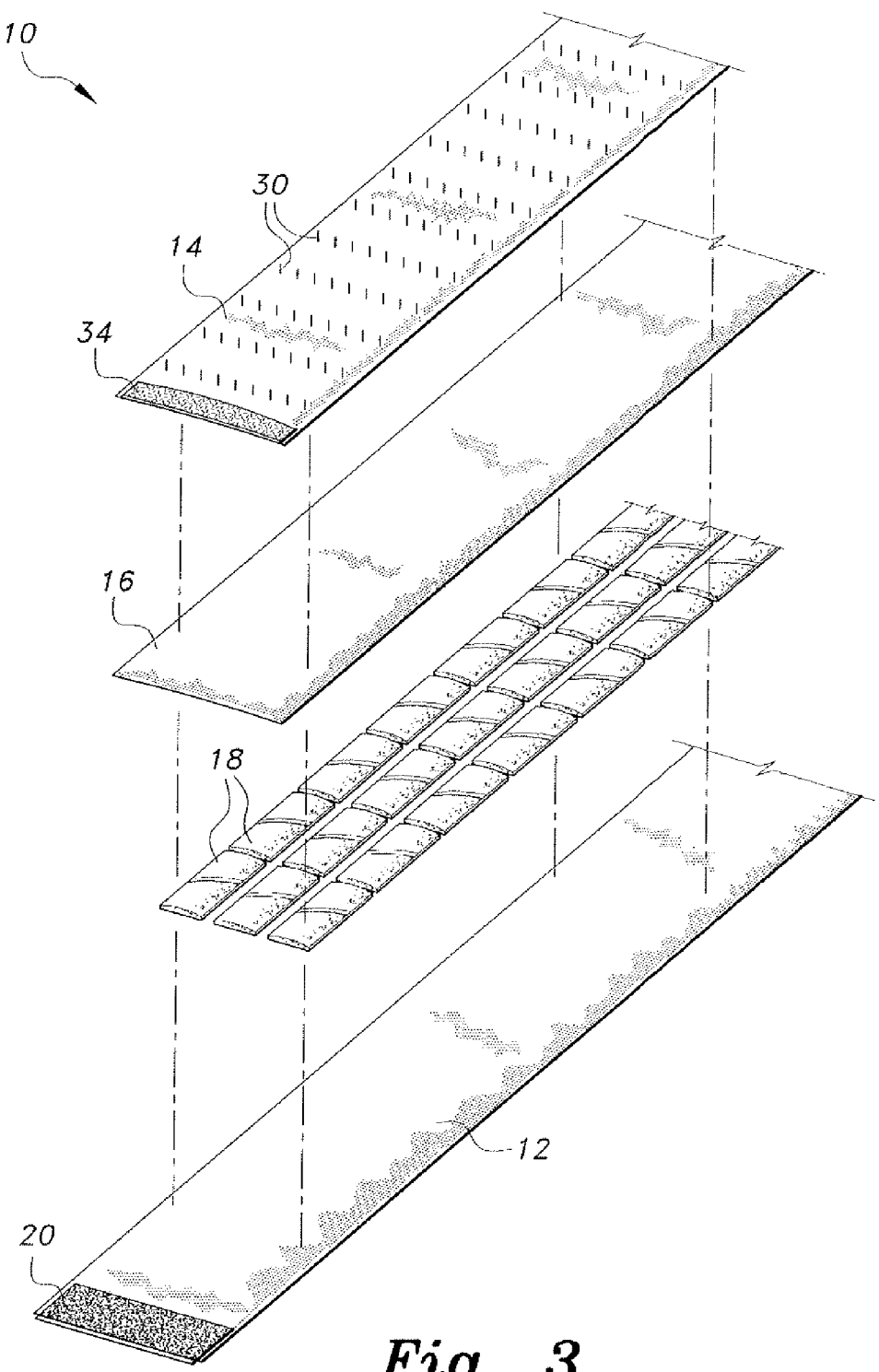
FIG. 3 is an exploded view of the emergency tire support device for low air pressure tire shown in FIG. 2.
Figure 4:
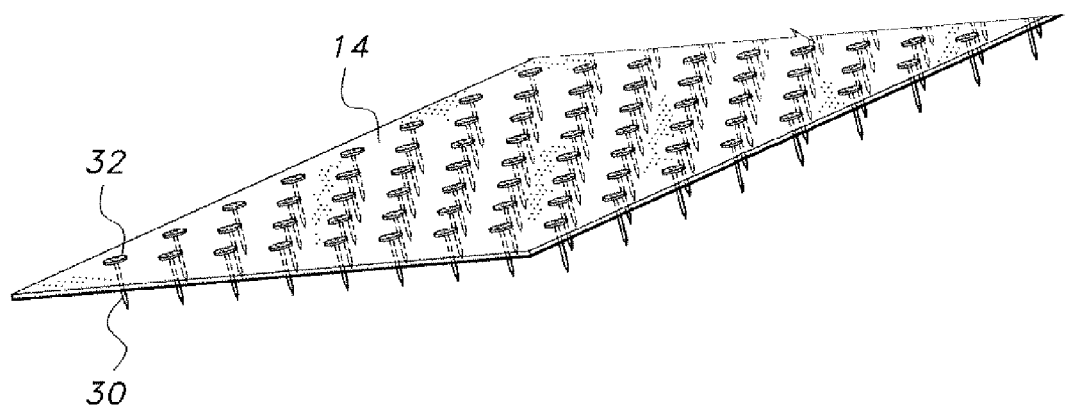
FIG. 4 is an enlarged perspective view of the third layer of the emergency tire support device shown in FIG. 2.

The emergency tire support device for low air pressure tire, generally referred to in the drawings by the reference number 10, provides a quick and easy layer of temporary tread to compensate for the reduced diameter in the deflated tire in order for the motorist or user to continue on to a location where the tire can be repaired or replaced in safety. As shown in FIGS. 1-3, the emergency tire support device 10 includes an elongate, multi-ply strip or belt configured to be wrapped around the tire T. The composite or multi-ply construction results in a layer of material that has durability, thickness and resiliency for protecting the deflated tire and function as a temporary outer tread layer for further conveyance.

As shown, the emergency tire support device 10 includes a first (outer) layer 12, a second (inner) layer 14, and a third (intermediate) layer 16. The first or outer layer or ply 12 is constructed from an elongate, flexible and durable cloth. Some examples include burlap, canvas, mesh and reinforced fabrics and the like. By way of example, the first layer 12 may be about 200 cm long, 15 cm wide and 1 mm thick. A first fastener strip 20 is disposed at one end of the first layer 12, and a second fastener strip 22 is disposed at the opposite end. When the emergency tire support device 10 is wrapped around a deflated or low air pressure tire T, the first and second fastener strips 20, 22 mate with each other to secure the emergency tire support device 10 thereon. In light of the use environment, the fastener strips 20, 22 must be fairly robust.

An example of such fasteners is high strength hook and loop fasteners. Snap-fit fasteners and the like can also be used. For optimal results, the first layer 12 should completely wrap around and overlap the circumference of the tire T. Since the first layer 12 will overlap, the first fastener 20 is disposed on the inner face of the first layer 12 while the second fastener strip 22 is disposed on the outer face. The edges of the first layer 12 can also be reinforced with stitching, which also helps to prevent fraying.

As shown in FIGS. 1-4, the second or inner layer or ply 14 includes an elongate layer or strip of flexible plastic having a plurality of tacks 30 pierced therethrough along the length thereof. For an outer layer having the dimensions cited above, the second layer 14 may be about 200 cm long, 15 cm wide and 1 mm thick. The sharpened section of the tacks extends about 0.25-0.75 in. from one side of the second layer 14. Shorter or longer lengths and combinations thereof can also be used. The flattened head 32 of each tack 30 prevents the tack 30 from extending further than desired. In use, the exposed sharpened section of the tacks 30 pierces the circumferential tread area of the tire to securely attach the emergency tire support device 10 thereon and prevent slip. Similar to the first layer 12, the second layer 14 also includes a fastener strip 34 disposed at one end thereof. The fastener strip 34 is configured to engage the second fastener strip 22 on the first layer 12 during use. Due to this engagement, the second fastener strip 22 is preferably long enough to facilitate attachment to both the first fastener strip 20 and the fastener strip 34, as well as allowing for some adjustment for different sized tires.

The simple pierced connection of the tacks 30 will not prevent the tacks 30 from slipping out. Thus, the third or intermediate layer or ply 16 is attached to the back side of the second, inner layer 14. Given the dimensions of the first layer 12 and the second layer 14 cited above, the third layer 16 may be about 200 cm long, 15 cm wide and 1 cm thick. It will be understood that the above dimensions are exemplary, and actual dimensions will vary, depending upon the size or circumference of the tire T. The thicker dimension of the third layer 16 provides structural support for sandwiching the head 32 of the tacks 30 between the second and third layers 14, 16 as well as providing structural rigidity to the overall emergency tire support device 10. The third layer 16 is preferably constructed from the same fabric as the first layer 12, and is attached to the second layer 14 via threads. As an alternative arrangement to the above, the third or intermediate layer 16 can be wrapped around the second or inner layer 14 so that the second layer 14 is covered in the intermediate layer 16 on both sides.

Figure 5:
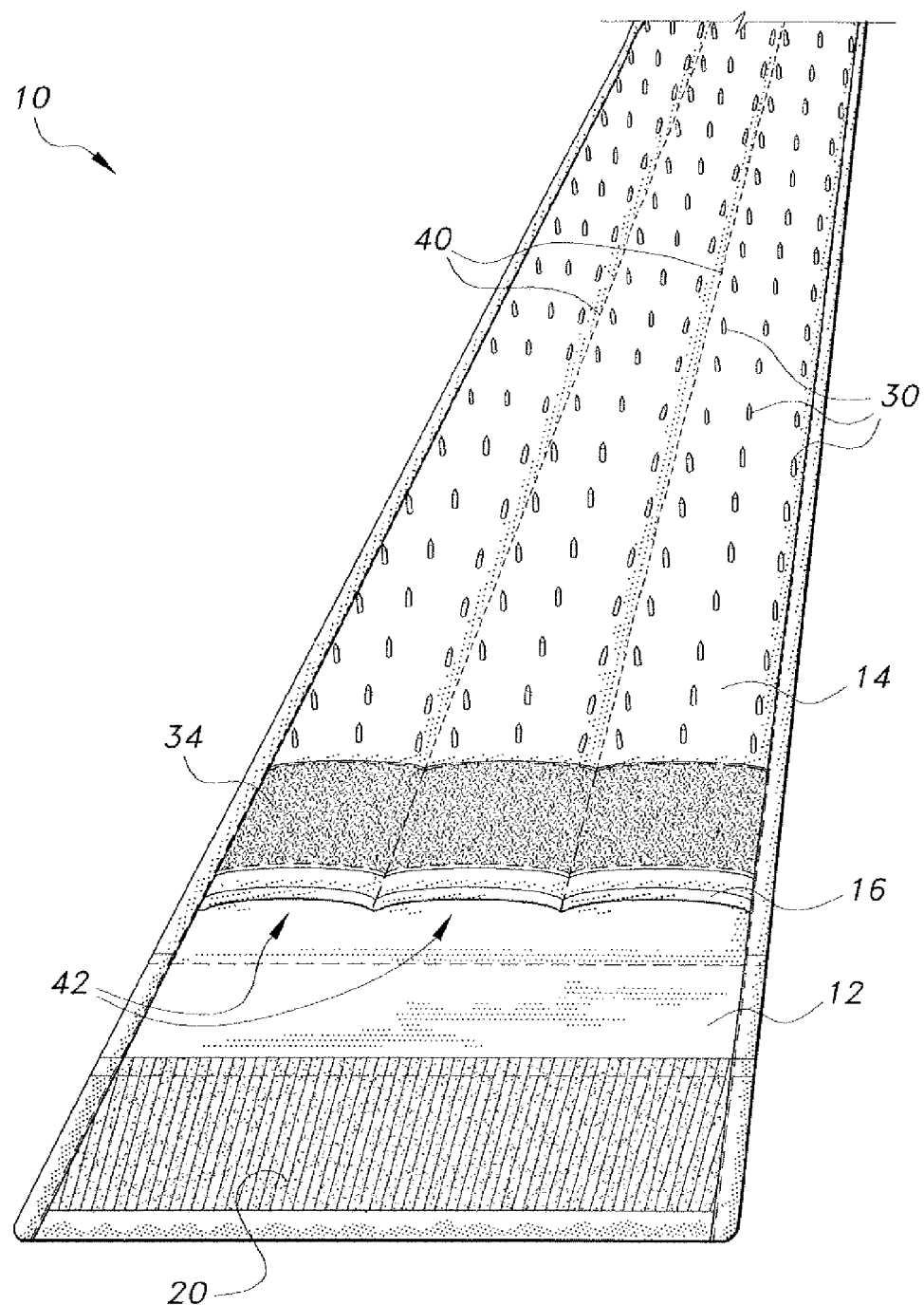
FIG. 5 is an enlarged partial perspective view of the front section of the emergency tire support device for low air pressure tire shown in FIG. 2.

With reference to FIG. 5, both the second and third layers 14, 16 are attached to the first layer 12 via stitching. In addition, a plurality of longitudinal seams 40 connect the layers to also define longitudinal pockets 42 that extend between the first (outer) and second (inner) layers 12, 14. These pockets 42 accommodate insertion of scrap rubber 18. The scrap rubber 18 is preferably derived from old and discarded tires for recycling purposes. The scrap rubber 18 simulates the resiliency of a normal tire tread while providing added thickness that compensates for the decreased dimensions of a deflated tire. Other similar resilient materials can be used in place of the scrap rubber 18. Furthermore, any number of pockets 42 can be formed between the layers.

Figure 6:
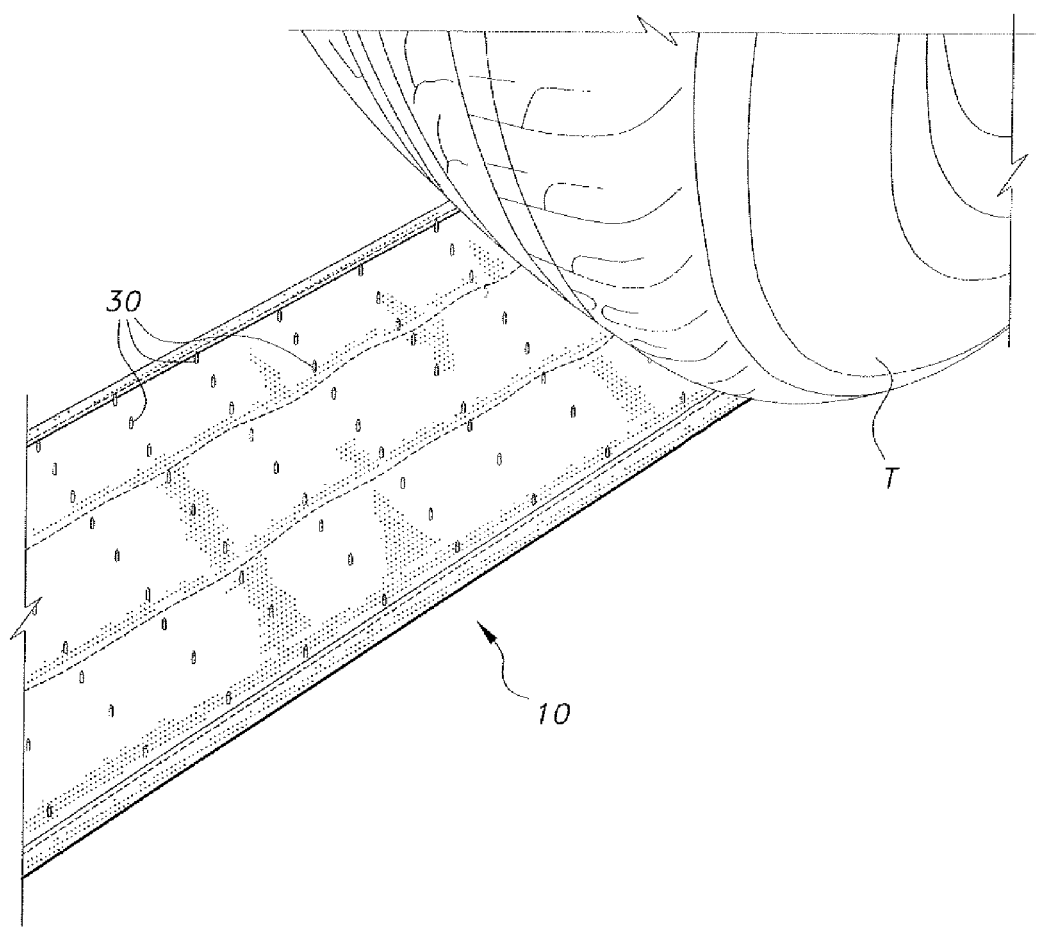
FIG. 6 is an environmental perspective view showing the mounting of the emergency tire support device of FIG. 2 onto a low air pressure tire.

As shown in FIG. 6, the emergency tire support device 10 is easily mounted onto a deflated or low air pressure tire T. Initially, the emergency tire support device 10 is laid in front or back of the tire T in line with the intended rolling direction. Once placed, the user slowly drives the vehicle over the emergency tire support device 10, thereby forcing the tacks 30 to puncture the tread area. This causes the emergency tire support device 10 to automatically wrap around the tire T as the tire T rolls along. When the emergency tire support device 10 is completely wrapped around the tire T, the user secures the ends of the emergency tire support device 10 via the strip fasteners 20, 22, 34.

Based on the above, it can be seen that the emergency tire support device 10 is a simple, quick and easy solution for temporary support and repair of low air pressure tires T, especially for those without a jack and/or spare tire. The emergency tire support device 10 is relatively lightweight and can be rolled up into a compact roll with the tacks 30 facing inward for easy storage. This can be of great benefit for those with limited space, or for those who do not wish to spare the room for a spare tire.

It is noted that although the first (outer) layer 12 is constructed from cloth, the cloth is durable and can withstand wear associated with the relatively short distance that must be traveled for permanent repair or replacement. In addition, the extension of the tacks 30 does not have to be long. They can be short enough to pierce the tire and maintain engagement thereon without further damaging the tire.

It is to be understood that the present invention is not limited to the embodiments described above, but encompasses any and all embodiments within the scope of the following claims.

I claim:

1. A emergency tire support device for a low air pressure tire, comprising:
    a flexible elongate, multi-ply belt adapted for wrapping around a tread area of the tire with low air pressure, the belt having at least one fastener at opposite ends thereof for securing the belt around the tire;
    a plurality of tacks extending through a ply of the multi-ply belt, the tacks being disposed on an inner face of the belt for piercing engagement with the tread area, each of the tacks having a head; and
    a layer of rubber scraps disposed within the multi-ply belt, the layer of rubber scraps adding thickness to the belt in order to compensate for reduced dimensions of the deflated tire and resiliency to simulate the normal resiliency of the tire tread.

2. The emergency tire support device for low air pressure tire according to claim 1, wherein said multi-ply belt comprises:
    an elongate outer, first layer;
    an elongate inner, second layer, said tacks extending through the second layer; and
    an elongate intermediate, third layer disposed between the inner and outer layers, the intermediate layer being connected to the inner layer to thereby sandwich the heads of said tacks therebetween, the inner and intermediate layers being attached to the outer layer by at least one elongate seam to form at least one longitudinal pocket between the outer and intermediate layers, the at least one longitudinal pocket being filled with said scrap rubber and extending substantially the length of said belt.

3. The emergency tire support device for low air pressure tire according to claim 2, wherein said outer layer is made from cloth.

4. The emergency tire support device for low air pressure tire according to claim 2, wherein said inner layer is made from plastic.

5. The emergency tire support device for low air pressure tire according to claim 2, wherein said intermediate layer is made from cloth.

6. The emergency tire support device for low air pressure tire according to claim 2, wherein said scrap rubber comprises tire scraps.

7. The emergency tire support device for low air pressure tire according to claim 2, wherein said at least one seam comprises at least two spaced seams of stitching between said outer, inner and intermediate layers, the two seams forming said at least one longitudinal pocket.

8. The emergency tire support device for low air pressure tire according to claim 2, comprising stitching connecting said outer, inner and intermediate layers to each other.

9. A emergency tire support device for a low air pressure tire, comprising:
- a flexible, multi-layer belt adapted for wrapping around a tread area of the tire with low air pressure, the belt having at least one fastener at opposite ends thereof for securing the belt around the tire, the belt having a first outer layer, a second inner layer and a third intermediate layer;
- a plurality of tacks extending through the inner layer, the tacks extending from an inner face of the belt for piercing engagement with the tread area, each of the tacks having a head, the intermediate layer sandwiching the heads between the inner layer and the intermediate layer; and
- a layer of rubber scraps disposed between at least two layers of the belt, the layer of rubber scraps adding thickness to the belt in order to compensate for reduced dimensions of the deflated tire and adding resiliency to simulate the normal resiliency of the tire tread.

10. The emergency tire support device for low air pressure tire according to claim 9, comprising at least two seams extending between said outer, inner and intermediate layers, the seams forming at least one longitudinal pocket between said outer and intermediate layers, the at least one longitudinal pocket being filled with said layer of rubber scraps and extending substantially the length of said belt.

11. The emergency tire support device for low air pressure tire according to claim 9, wherein said outer layer is made from cloth.

12. The emergency tire support device for low air pressure tire according to claim 9, wherein said inner layer is made from plastic.

13. The emergency tire support device for low air pressure tire according to claim 9, wherein said intermediate layer is made from cloth.

* * * * *